US006825847B1

(12) United States Patent
Molnar et al.

(10) Patent No.: US 6,825,847 B1
(45) Date of Patent: Nov. 30, 2004

(54) SYSTEM AND METHOD FOR REAL-TIME COMPRESSION OF PIXEL COLORS

(75) Inventors: Steven E. Molnar, Chapel Hill, NC (US); Bengt-Olaf Schneider, Carmel, NY (US); John Montrym, Cupertino, CA (US); James M. Van Dyke, Austin, TX (US); Stephen D. Lew, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 146 days.

(21) Appl. No.: 10/006,409

(22) Filed: Nov. 30, 2001

(51) Int. Cl.[7] ................................................ G09G 9/00
(52) U.S. Cl. ........................................ 345/555; 345/611
(58) Field of Search ................................ 345/530, 418, 345/419, 422, 581, 589, 591, 611, 612, 501, 506, 519, 555, 549, 547

(56) References Cited

U.S. PATENT DOCUMENTS

| | | | |
|---|---|---|---|
| 6,072,500 A | 6/2000 | Foran et al. ................. | 345/431 |
| 6,075,544 A | 6/2000 | Malachowsky et al. ...... | 345/509 |
| 6,215,500 B1 * | 4/2001 | Deering ........................ | 345/426 |
| 6,337,747 B1 * | 1/2002 | Rosenthal ..................... | 358/1.15 |
| 6,407,741 B1 | 6/2002 | Morein et al. ................ | 345/555 |
| 6,525,723 B1 * | 2/2003 | Deering ........................ | 345/419 |
| 6,614,449 B1 * | 9/2003 | Morein ......................... | 345/555 |
| 2001/0028352 A1 * | 10/2001 | Naegle et al. ............... | 345/501 |

OTHER PUBLICATIONS

Torborg et al., "Talisman: Commodity Realtime 3D Graphics for the PC", Microsoft Corporation.

Kurt Akeley, "RealityEngine Graphics," SIGGRAPH '93 Conference Proceedings, pp. 109–116, 1993.

* cited by examiner

Primary Examiner—Kee M. Tung
(74) Attorney, Agent, or Firm—Zilka-Kotab, PC (57) ABSTRACT

A system and method are provided for the compression of pixel data for communicating the same with a frame buffer. Initially, a plurality of samples is received. It is first determined whether the samples are reducible, in that a single sample value can take the place of a plurality of sample values. If it is determined that the samples are capable of being reduced, the samples are reduced. Reduction is a first stage of compression. It is then determined whether the samples are capable of being compacted. The samples are then compacted if it is determined that the samples are capable of being compacted. Compaction is a second stage of compression. The samples are then communicated with a frame buffer, in compressed form, if possible, in uncompressed form if not. Subsequent reading of frame buffer data takes advantage of the smaller transfer size of compressed data. Compressed data is uncompacted and expanded as necessary for further processing or display. Where possible, data is processed reduced, rather than expanded, to minimize the amount of processing required and transfer bandwidth required. This system and method accelerate the rendering and display of computer-generated images.

66 Claims, 8 Drawing Sheets

SYSTEM AND METHOD FOR REAL-TIME COMPRESSION OF PIXEL COLORS

FIELD OF THE INVENTION

The present invention relates to compression algorithms in a computer graphics system, and more particularly to compressing data to be stored in a frame buffer of a computer graphics system.

BACKGROUND OF THE INVENTION

Rendering a computer-generated image entails several steps. Such an image is traditionally composed of many primitive objects, e.g. triangles. Each triangle is initially transformed into a screen-aligned coordinate system. Thereafter, rasterization breaks each triangle into fragments. Conventionally, there is one fragment for each screen pixel covered by the triangle.

Each fragment has associated with it a number of data items, including one or more color and depth values. The depth value is used to determine which fragments will be visible on the screen (z-buffering). The fragment color and depth values are written to the display memory if the fragment is determined to be visible.

A typical scene is composed of many triangles. As each triangle covers a number of pixels, the number fragments to be written to the display memory can be large. For instance, a scene may be composed of 1,000,000 triangles, each of which may cover 50 pixels. If the scene is rendered 60 times a second, 300,000,000 fragments must be generated, processed and sent to the frame buffer every second.

If each such fragment carries about 10 bytes of data, 3 Gbytes of data must be processed and stored every second. Further, many applications arithmetically blend newly rendered fragments with the contents of the frame buffer, doubling the data that must be transferred to and from the frame buffer.

The foregoing problem is exacerbated if anti-aliasing is performed. In the most common antialiasing algorithms, supersampling, and multisampling; multiple fragments are computed and stored in the frame buffer for every screen pixel in order to reduce sampling artifacts in the rendered image (See U.S. Pat. No. 6,072,500). Antialiasing using these techniques, therefore, increases the load imposed on the fragment processing stage of a graphics system proportionally to the number of samples per pixel.

In particular, the problems associated with processing a large number of fragments are set forth Table 1.

TABLE 1

Frame buffer accesses for reading and writing pixel data require a large amount of frame buffer bandwidth. In many systems the available frame buffer bandwidth limits the fragment-processing rate. Similarly, transferring the fragments between the internal stages of a graphics system demands a high internal bandwidth in the fragment processing stage and also may limit the fragment-processing rate. Processing the fragments as they travel through the graphics system consumes a large amount of processing power, e.g. for z-buffering, alpha blending, etc. Available processing power may also limit the fragment-processing rate.

There is thus a need for a graphics processing technique that addresses these problems by compressing fragments as they travel through the graphics system and by storing them in a compressed format in the frame buffer.

DISCLOSURE OF THE INVENTION

A system and method are provided for the compression of pixel data for storing the same in a frame buffer during the process of rendering. Initially, a plurality of samples is received. It is then determined whether the samples are capable of being compressed. The samples are then compressed if it is determined that the samples are capable of being compressed. The samples are then transferred to a frame buffer for storage therein.

In one embodiment, the samples may be packed into tiles corresponding to rectangular regions in screen space. Further, some of the samples in the rectangular regions may be null. As an option, the samples may be generated by multi-sampling. Such multi-sampling may produce identical color values for samples covered by a primitive. Still yet, the compression may be lossless.

In another embodiment, the aforementioned determining operation may include determining whether all of the samples are covered. Further, the determining operation may include determining whether all of the samples that fall within the same pixel have identical color values. Such operations may thus represent pre-conditions for compression.

In still another embodiment, the compression may represent samples of identical color value by one sample with the color value, i.e. reduction. Moreover, the compression may include reduction and compaction. While reduction represents samples of identical color value by one sample with the color value, compaction reduces the number bits required to store the samples. Compaction may be performed by any of a variety of methods for compressing regions of image data, such as vector quantization, wavelet compression, color cell coding, or other methods that will be readily apparent to one skilled in the art.

In still another embodiment, compaction may include: establishing an anchor sample, computing gradients in two independent directions, computing predicted pixel values for all samples, computing differences between predicted and actual sample values, determining whether the gradients and the differences are capable of being represented with a predetermined number of bits, and storing the anchor sample, the gradients and the differences with the predetermined number of bits, if possible. As an option, the compaction may be performed by a selected one of several methods, where the selected method is encoded in the compressed samples.

In still another embodiment, the aforementioned transferring operation may include storing compressed samples if it is determined that the samples are capable of being compressed and storing uncompressed samples if it is determined that the samples are incapable of being compressed. One or more bits may be stored in memory to indicate whether the samples are stored compressed or uncompressed, and, as an option, to select among compression formats. Such memory may reside on a chip capable of processing the samples.

Another system and method are provided for processing compressed pixel data. Initially, a plurality of samples is received. Optionally, for example, if needed for blending, or to expand compressed data, samples are read from a frame buffer. The data is read from a location in the frame buffer associated with the received samples. Data that is read may be returned compressed or uncompressed.

It is then determined whether the samples can be processed in reduced form or if they must be processed in expanded (non-reduced) form. These samples are then processed in the appropriate form. Then, an attempt is made to compress the processed samples, and the processed samples are written to the frame buffer.

In one aspect of the present embodiment, the plurality of samples may be generated by multi-sampling. Further, the plurality of samples may be organized as rectangular regions in screen space.

In another aspect, the reading may include identifying samples that are covered, issuing a read request to the frame buffer for the covered samples, receiving color values for the covered samples, and un-compacting the color values if the read color samples are stored compressed in the frame buffer and need to be compacted.

As an option, the read request may include a conditional read request. A conditional read request returns data only if the samples stored in the frame buffer are compressed. Conditional read requests may be useful to efficiently expand compressed samples when new samples are received that cannot be compressed and frame buffer samples are not otherwise needed, for example, for blending.

In still another aspect, the determining operation may include determining whether the samples are in reduced form. Moreover, the processing may include using a color value that represents all of the samples in reduced form.

On the other hand, the processing in expanded form may include expanding reduced received samples into expanded form. It may also include expanding read samples into expanded form. Thereafter, the samples are processed in the expanded form.

In still yet another aspect, the aforementioned attempting operation may include (i) determining whether all of the received samples are covered, determining whether all of the received samples are in reduced form, (ii) determining whether it is permissible to store the received samples in a compressed form, and (iii) determining whether the received samples are capable of being represented in the compressed form. As such, the received samples may be converted to the compressed form if (i)–(iii) are true.

Another system and method are provided for transferring a set of samples to a frame buffer in a graphics system. Initially, a set of a plurality of samples is received. It is then determined whether the set of samples is capable of being compressed. If it is determined that the set of samples is capable of being compressed, the set of samples is compressed. Then, the set of samples is transferred to a frame buffer. A size of the set of samples is dictated by a transaction size of the frame buffer.

In one aspect of the present embodiment, a set of samples may be transferred from the frame buffer, and optionally compressed. Moreover, the set of samples may include a rectilinear set of samples. Still yet, the transaction size of the frame buffer may be a size of data that the frame buffer is capable of reading and writing. As an option, a plurality of the sets of samples may form a single frame.

As an option, the compressed samples read during scan out processing of one scan line may be retained and used for processing of subsequent scan lines.

In another embodiment, the frame buffer may be cleared by writing compressed samples to the frame buffer. Further, an identifier may be included in the compressed samples indicating that the compressed samples are associated with the clearing of the frame buffer.

Still yet, the various operations above may be carried out "on-the-fly," or in other words, during a frame buffer read or write update process.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
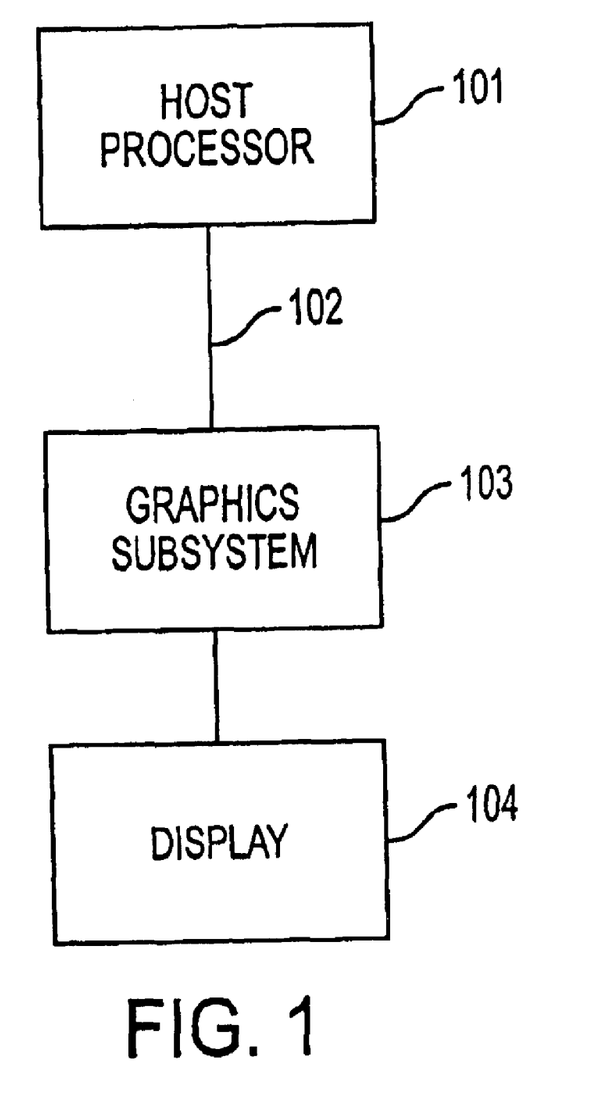
FIG. 1 shows a block diagram of a graphics computer, in accordance with one embodiment.

FIG. 1 shows a block diagram of a graphics computer, in accordance with one embodiment. As shown, a host processor 101 stores and executes an application program. Such application program issues graphics commands over a connection 102 to a graphics subsystem 103. The interconnect 102 can either be a general purpose bus that is shared with other I/O devices, e.g. PCI bus, or a dedicated graphics bus, e.g. AGP. Of course, any type of interconnect 102 may be utilized. In use, the graphics subsystem 103 may receive graphics commands and, in response, either update its internal state or renders primitives described by the host processor 101 to a display device 104.

Figure 2:
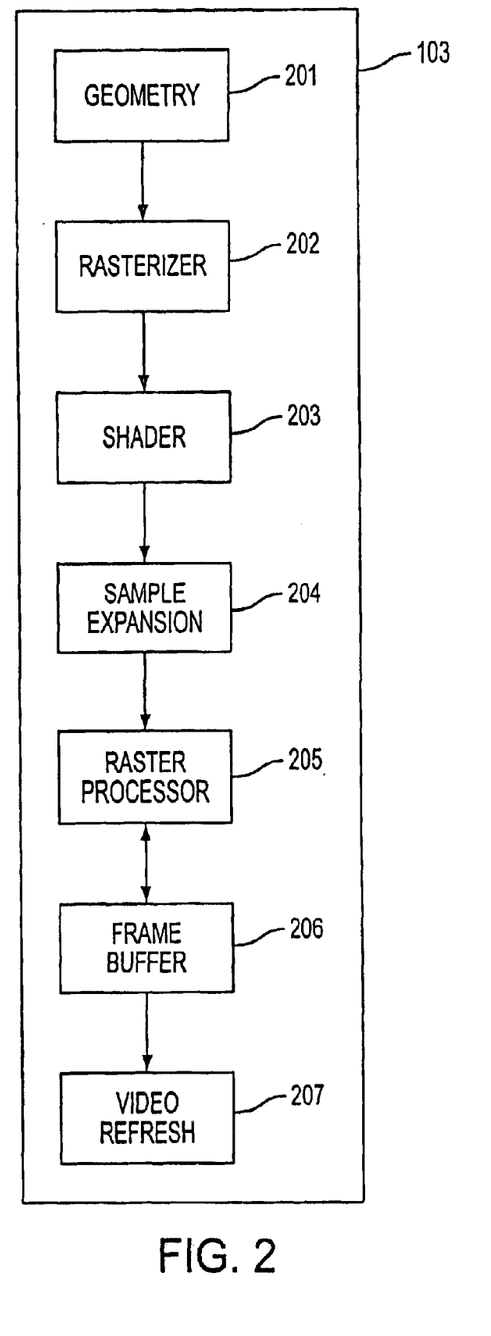
FIG. 2 illustrates a more detailed diagram of the graphics subsystem of the graphics computer of FIG. 1.

FIG. 2 illustrates a more detailed diagram showing the internal structure of the graphics subsystem 102 of FIG. 1. As shown, a geometry stage 201 is provided which transforms primitives into a screen-aligned coordinate system. The geometry stage 201 also may remove portions of the primitives that fall outside the rendering area (clipping). Other computations may be performed by the geometry stage 201 such as lighting to determine the color of each vertex describing the primitives.

The transformed vertices form the input for a rasterizer 202. The rasterizer 202 computes a fragment for each pixel covered by each of the primitives. A coverage mask stored with the fragment indicates which portions of the pixel the fragment covers.

Also included is a shader 203 that computes the final fragment, e.g. by applying texture maps or shader programs to the fragment. A sample expansion stage 204 then generates multiple samples for each fragment.

Figure 3:
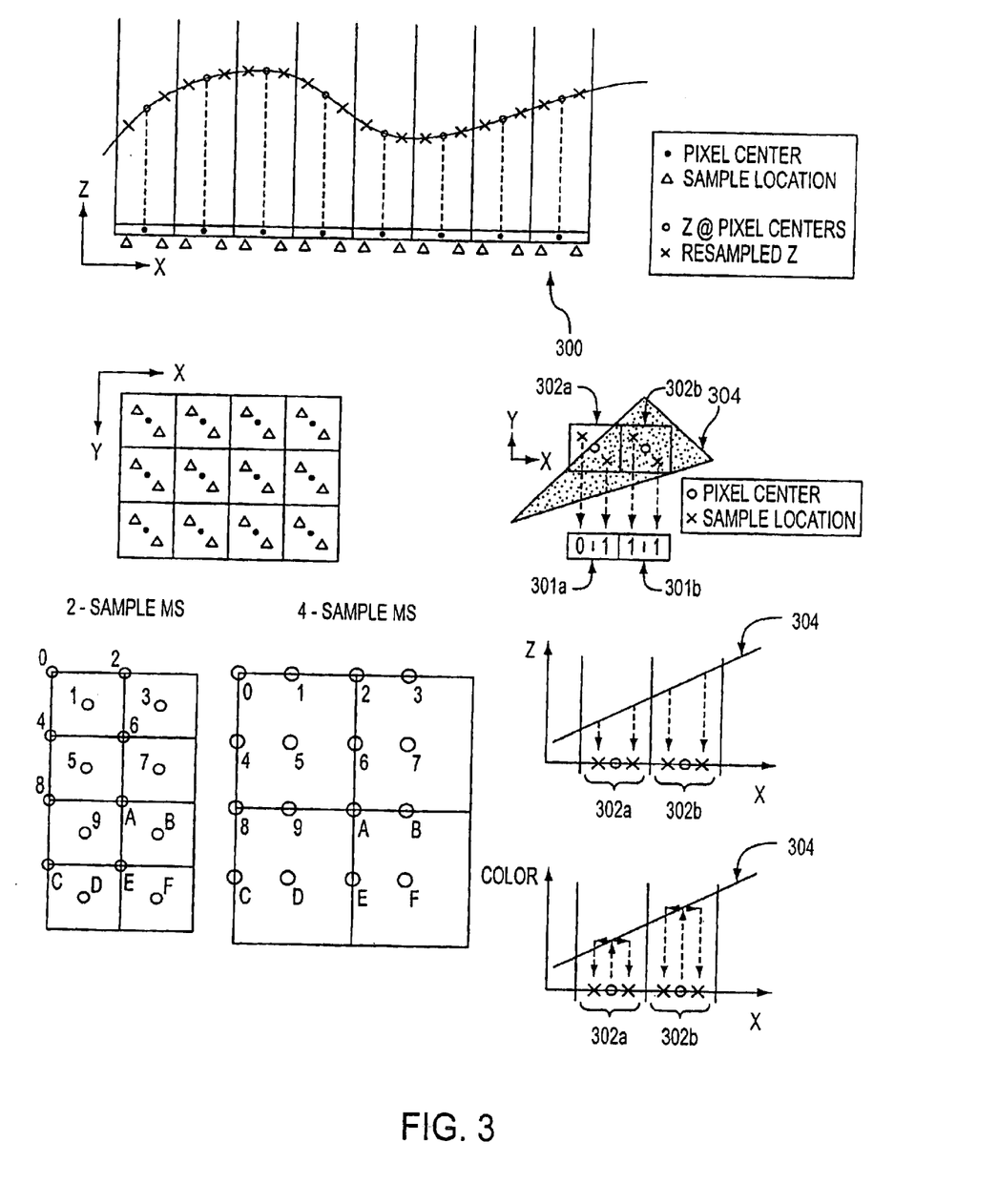
FIG. 3 illustrates the effect of multi-sampling, in accordance with one embodiment.

FIG. 3 illustrates the effect of multi-sampling. The sample expansion stage receives fragments containing sample masks (301a and 301b), computed by the rasterizer 202. The coverage bits within the sample masks indicate which samples within pixels (302a and 302b) the primitive 304 covers. The sampling expansion stage 204 generates a new sample fragment for each covered sample in the sample mask. The process of multisampling 306 adjusts the fragment depth value to approximate the actual depth value at each sample location in the pixel. All samples within a fragment carry the same color. FIG. 3 shows one possible sample patterns for 2-sample multisampling 308 and 4-sample multisampling 310. Other sample patterns, and patterns with differing numbers of samples per pixel may be chosen, of course.

After multi-sampling, the individual samples are sent to a raster processor 205 as if they were regular fragments. The raster-processor 205 performs various operations on the fragments, including z/stencil testing and color or alpha blending. This may require the raster processor 205 to read a frame buffer memory 206 in order to retrieve the destination Z or the destination color. To this end, the final pixel color and Z are written back to the frame buffer memory 206.

When all primitives in the scene have been rendered in this manner, the contents of the frame buffer memory 206 are scanned out by a video refresh unit 207 and sent to the display 104. In the case of a multi-sampled color buffer, the (high-resolution) multisample image is downfiltered to display resolution. Downfiltering can be done during the process of scan out and display. Alternatively, downfiltering can be done as a separate operation prior to display.

In one preferred embodiment, all the foregoing components of the graphics system 103 except the frame buffer memory 206 are situated on a single semiconductor platform. Of course, the various modules may also be situated separately or in various combinations of semiconductor platforms per the desires of the user. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation.

Typically, the frame buffer memory 206 takes the form of dynamic random access memory (DRAM). Such DRAM is organized as a matrix of storage bits. Read or write accesses to bits in the same row can be performed more efficiently than to bits in different rows. In one preferred embodiment, data within the frame buffer 206 is organized so that data for 4×4-sample "sets" are stored at contiguous addresses within the same DRAM bank and row.

In the context of the present description, such set of samples may include a rectilinear set of samples, a convention "tile," or any other desired grouping of samples. As an option, a plurality of the sets of samples may form a single frame, such that sets of samples may be transferred as an image is assembled piece-by-piece.

To fully exploit the faster access time to pixels in a tile, processing of fragments is organized such that fragments for samples in a particular tile are collected and processed together. While various techniques may be employed for accomplishing this, one suitable technique may be found with reference to U.S. Pat. No. 6,075,544.

In the present description, it may be assumed that tiles are 4×4 sample neighborhoods, i.e. sample fragments are processed in groups of up to 16. It should be noted, however, that tile sizes larger and smaller are possible and may be preferable in certain circumstances.

For example, a size of the set of samples is dictated by a transaction size of the frame buffer. Such transaction size of the frame buffer may be a size of data that the frame buffer is capable of reading and writing in an efficient manner.

Figure 4:
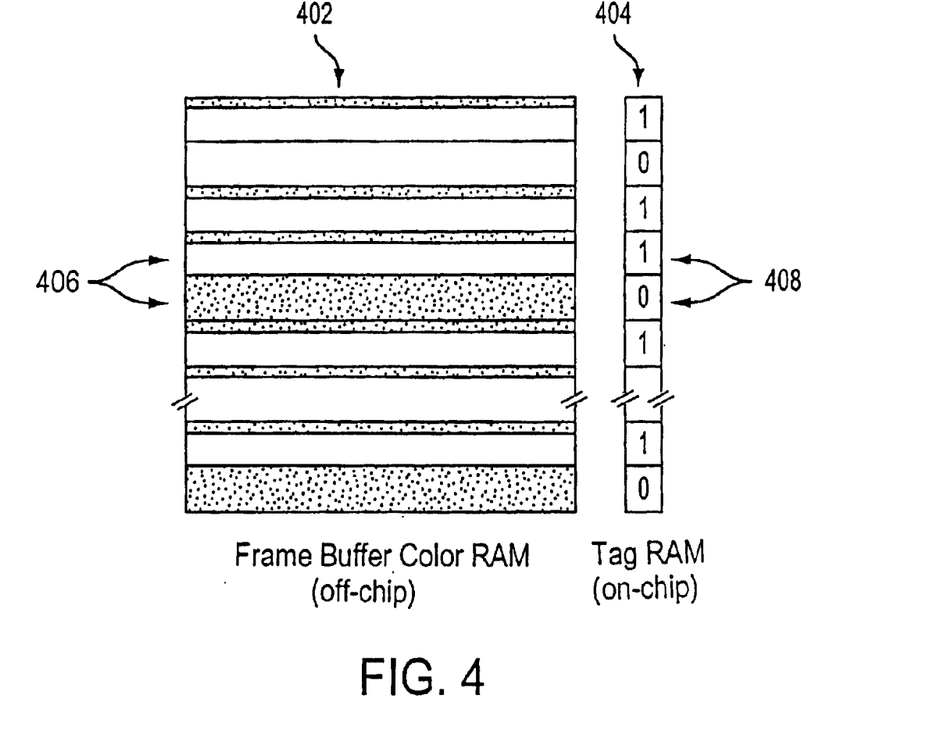
FIG. 4 illustrates the contents of the frame buffer and the tag memory.

FIG. 4 illustrates the contents of the frame buffer memory 402 and an associated tag memory 404. For every tile 406 stored in the frame buffer memory, a tag bit 408 is allocated in the tag memory. Such tag memory may or may not reside on a chip associated with the graphics subsystem 103. Each bit in the tag memory stores the compression status of the associated frame buffer tile. This allows frame buffer clients (e.g. the raster processor 205 or the video refresh unit 207) to interpret the contents of the frame buffer memory 206 properly. Further shown is the manner in which some tiles require a full allocated memory space while some tiles require a fraction thereof, as set forth hereinabove.

It should be noted that not every tile is compressible. In some applications, most or all tiles will be compressible. In others, none may be compressible. Because one cannot guarantee how many tiles will compress, space is allocated in the frame buffer memory 402 for the worst-possible case—that of all tiles being incompressible.

A data structure is thus provided including color objects (i.e. 406) with color information, and compression format objects (i.e. 408) associated with the color objects. The compression format objects are thus capable of identifying a type of compression (none, type1, etc.) carried out on the color objects. In use, the compression format objects are capable of being utilized to decompress the color objects.

The compression format objects 408 thus act as identifier for indicating whether the samples are compressed and, if so, what type of compression is associated therewith. This may also be accomplished utilizing format code. As an option, the identifier and/or format code may be stored in the compression samples.

Figure 5:
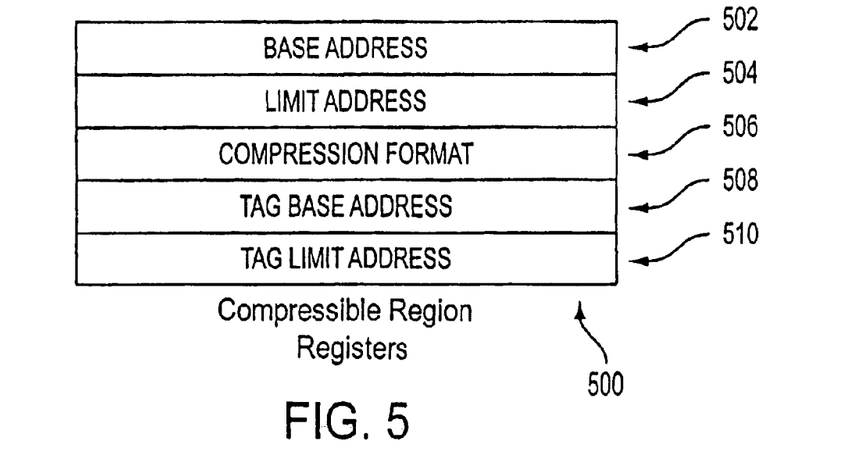
FIG. 5 illustrates registers used to designate portions of the frame buffer address space as compressible.

FIG. 5 illustrates addressing registers 500 that identify portions of memory as being compressible and to associate tag bits with tiles in memory. One or more such sets of registers may be provided, each describing separate portions of memory that may be compressible. The base address 502 indicates the starting address of a compressible region. The limit address 504 indicates the ending address of a compressible region. The compression format register 506 designates a compression format for the region. Possible values might include "uncompressed", "color compression format A", "color compression format B", "z compression format A", etc. The base tag address register 508 indicates the first tag bit associated with the tiles in the region. The max tag address register 510 indicates the last tag bit associated with the tiles in the region. As an option, the registers may be programmed to allow some tiles within the region to be compressible and others not, for example, to allow for the case of not having enough tag bits for every tile.

By associating tag bits with selected portions of the memory address space, rather than with particular buffers accessed by one client (e.g. the raster processor), any client can access compressed or compressible data such that these clients have no knowledge that the data stored in memory may be compressed. For further information on how accesses from other clients may be performed transparently, see U.S. patent application Ser. No. 09/687,036 filed Oct. 12, 2000 and entitled "Method And Apparatus For Managing And Accessing Depth Data In A Computer Graphics System".

Figure 6:
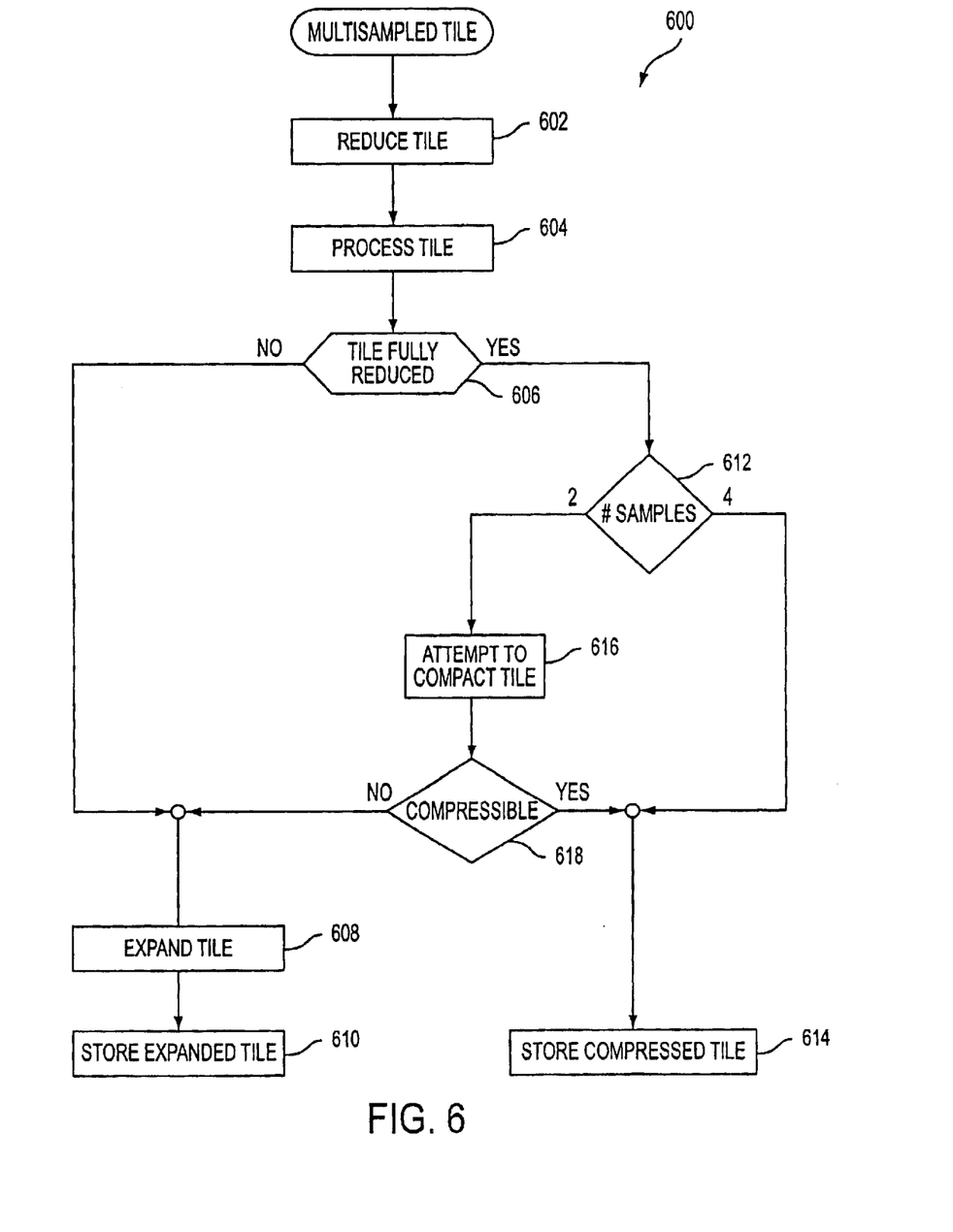
FIG. 6 illustrates a flowchart showing a method for reducing memory bandwidth and processing cycles, in accordance with one embodiment.

FIG. 6 illustrates a flowchart showing a method 600 for reducing memory bandwidth and processing cycles, in accordance with one embodiment. As shown, such method 600 represents an overview of the operations involved in processing and storing a multi-sampled tile.

Initially, a multisample tile is received. As described above, in the present embodiment, all samples within a pixel that are covered by a primitive are assigned the same color. Uncovered samples are considered "invalid" or "null." If the primitive covers the entire pixel, all samples are assigned the same color.

The method 600 begins by reducing identical color samples. See operation 602. In the context of the present description, "reduced" refers to any reduction of samples that exploits the similarity of the attributes thereof that resulted from an anti-aliasing procedure.

Since samples in a tile may come from different primitives, some may be reduced and others may be fully expanded. A tile is "fully reduced" if all fragments in the tile are reduced. The compression ratio for a fully reduced tile also equals the number of samples per pixel. As an option, reduction can be performed on subsets of a tile: a subset of a tile is reducible if all fragments within it are reducible.

The compression ratio achieved by such reduction equals the number of samples per pixel. Such technique may thus be used to reduce fragments for a different number of samples per pixel. In the following, sampling patterns that have either 2 or 4 samples per pixel will be set forth, creating compression ratios of 2 and 4, respectively. Of course, these values may vary per the desires of the user.

Figure 9:
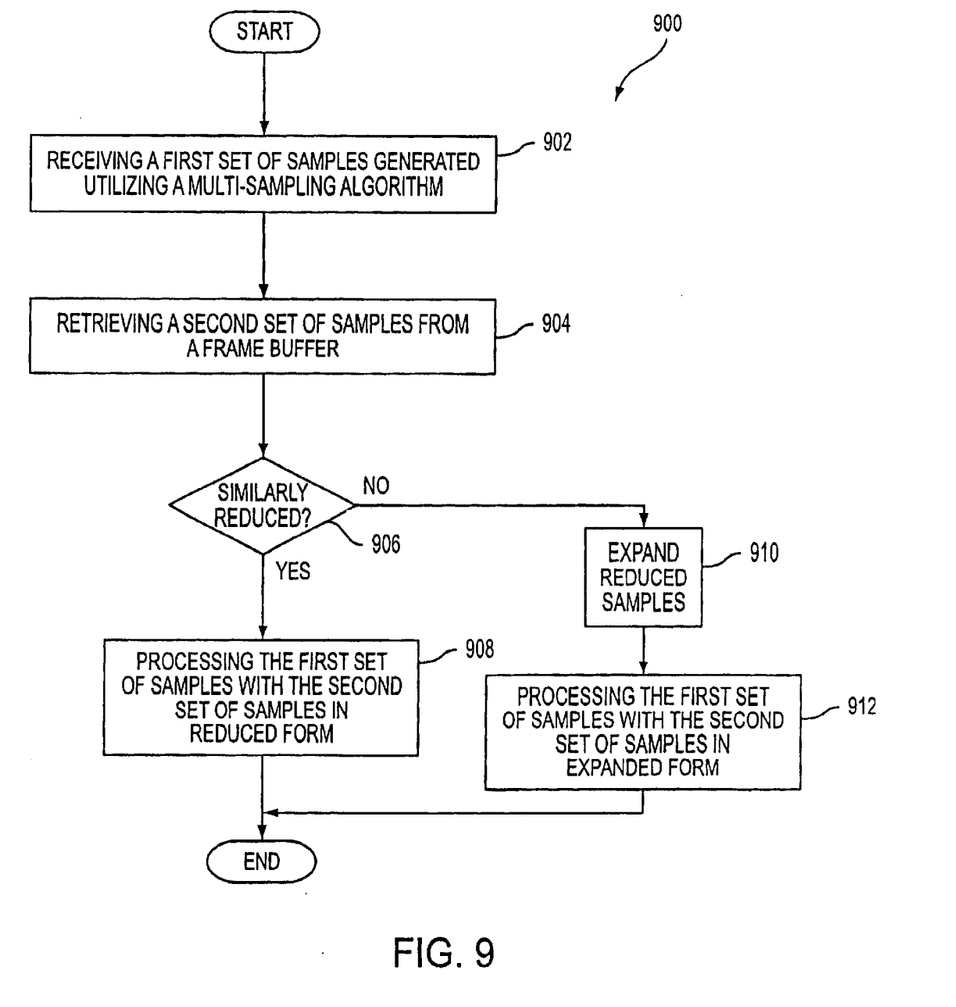
FIG. 9 illustrates a method for processing samples in a graphics system, in accordance with one embodiment.

In operation 604, the fragments of the multisample tile are processed. Such processing may include any type of blending, shading, or any other type of graphics processing that is desired. Processing may or may not require data to be read from the frame buffer. The treatment of data read from the frame buffer is illustrated in FIG. 9 and will be described later. Because reduced fragments contain all the color information of expanded fragments, processing can be performed on reduced data, increasing the effective sample throughput of the graphics processing system.

In decision 606, it is determined whether the tile is fully reduced. If not, the tile is "expanded," meaning that all reduced fragments are replicated into their expanded form. The expanded tile is then stored in the frame buffer memory 206. See operations 608 and 610, respectively. Expansion of partially reduced tiles is necessary, since only full-reduced tiles can be compressed.

In one preferred embodiment, a compression ratio of 4:1 is desired. In 4-sample multisampling, reduction alone provides a 4:1 compression ratio, and is therefore sufficient compression alone. In 2-sample multisampling, reduction only provides 2:1 compression. An additional 2:1 compression by compaction is required to achieve the desired 4:1 compression ratio. Compaction is the application of a compression algorithm on the bits of the reduced tile. Compaction can be accomplished using a variety of different algorithms, as will be described later.

If it is determined that the tile is fully reduced in decision 606, it is then determined in decision 612 whether the aforementioned multisampling was 2-sample multisampling or 4-sample multisampling. As such, if it is determined that 4-sample multisampling was employed, the reduced tile is stored in operation 614. However, if it is determined that 2-sample multi-sampling was employed, an attempt is made to further compress the tile by compaction in operation 616. As will soon become apparent, such compaction may or may not be successful. In particular, the number of bits for the compacted representation must fit into 128 bits or less. If it is determined in decision 618 that the compaction is successful, the compressed tile is stored in operation 614. If it is determined that the compaction is not successful, the reduced tile is expanded and stored in the frame buffer memory 206 in operation 610. Of course, an alternate embodiment could store the reduced, uncompacted tile directly in the frame buffer achieving 2:1 compression.

To this end, the present method 600 may be viewed as a way of losslessly compressing tiles of samples. First, it is determined as to whether the samples are capable of being losslessly compressed. If it is determined that the samples are capable of being losslessly compressed, the samples may be losslessly compressed. Such lossless compression of the present embodiment may be made transparent to other applications and clients using the techniques described during reference to FIG. 6.

The present method 600 thus saves bandwidth and processing for compressible tiles, but does not necessarily reduce frame buffer storage requirements. Of course, any desired modification may be made to reduce frame buffer storage requirements.

Compaction may be performed using a variety of methods that will be familiar to one who is skilled in the art. Such methods may include, but is not limited to vector quantization, entropy encoding, run-length encoding, cell-based compression methods, wavelet or other transform-based compression methods, or any other method customarily employed to compress image data.

Figure 7:
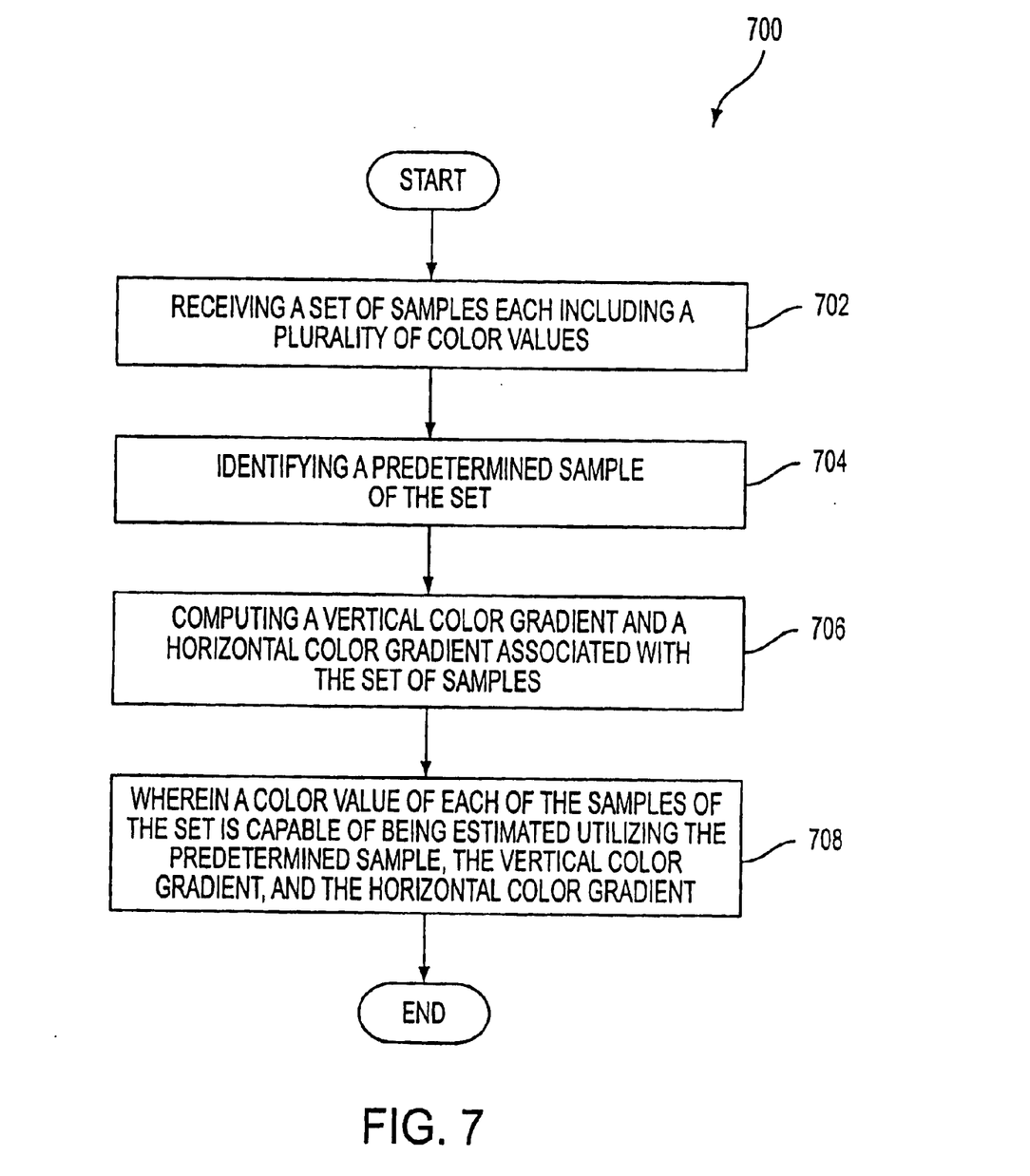
FIG. 7 illustrates one exemplary method for compressing a tile, in accordance with operation 616 of FIG. 6.

FIG. 7 illustrates one exemplary method 700 for compacting the tiles, in accordance with operation 616 of FIG. 6. First, in operation 702, a set of samples are received each including a plurality of color values. Then, in operation 704, a predetermined "anchor" sample of the set is identified. Moreover, a vertical color gradient and a horizontal color gradient associated with the set of samples are computed. See operation 706. Gradients are thus calculated in independent directions. As such, a color value of each of the samples of the set is capable of being estimated utilizing the predetermined sample, the vertical color gradient, and the horizontal color gradient. Note operation 708.

Figure 8:
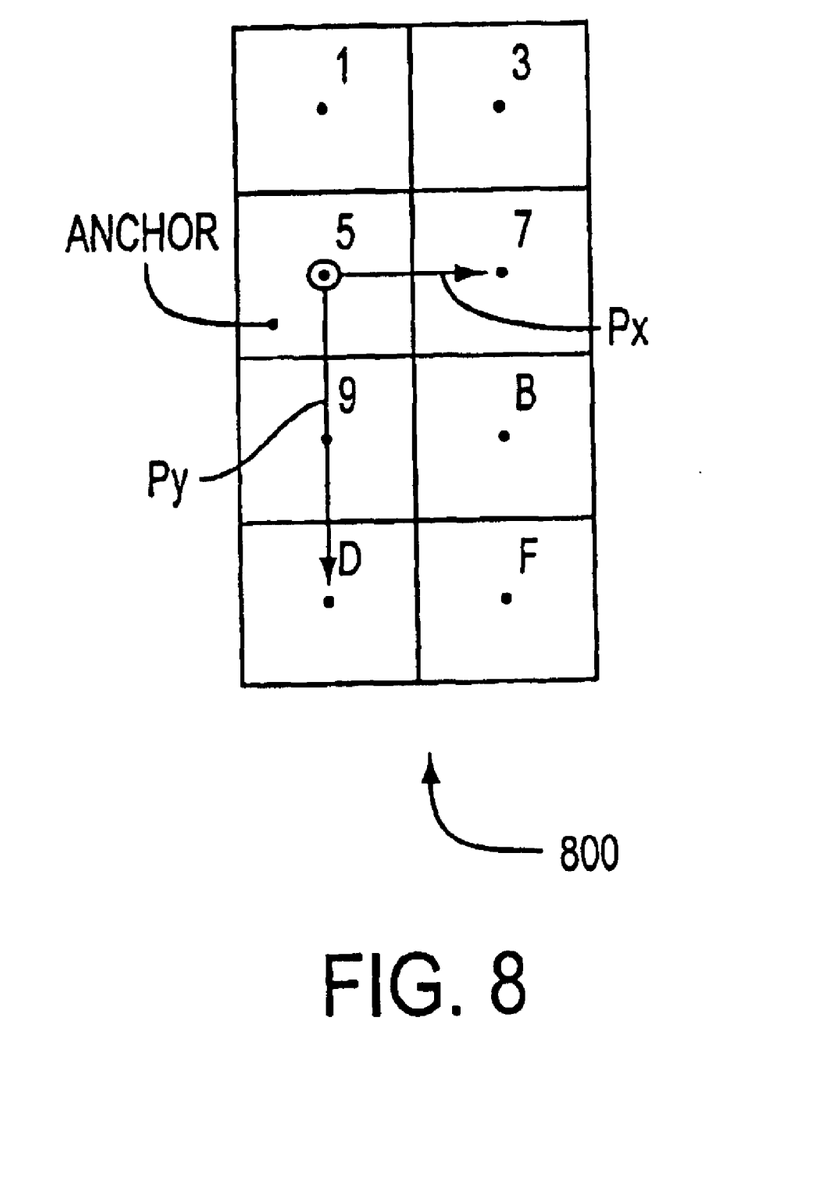
FIG. 8 depicts the reduction and compression for a tile of pixels with 2 samples each.

FIG. 8 depicts the reduction and compression for a tile 800 of pixels with 2 samples each. The 16 samples in the tile are first reduced to 8 samples, as shown in FIG. 8. As set forth hereinabove, the compression step attempts to compute vertical and horizontal color gradients to describe the change of color values across the tile. The gradients are called "predictors" (Px and Py). Such predictors are computed with reference to a chosen pixel known as a selected "anchor" pixel (A).

Given the anchor and the predictors, an estimated color value may be computed for every pixel in the tile. For each pixel in the tile, the difference between the actual and the estimated color value is computed. These differences are called "delta" values.

Table 2 illustrates equations that describe how predictors and deltas are computed from a given set of pixel values. Actual pixel values are referred to as Cx, where x is the number of a pixel. See FIG. 3 for the pixel numbering. The delta value for a given pixel is called Cxd. The notation ⌊ . . . ⌋ denotes the floor of the expression between these brackets. It should be understood, that all colors are typically represented as a set of color channels, e.g. red, green, blue and alpha. The following equations may be interpreted as vector equations, i.e. A=C5 means A.red= C5.red, A.green=C5.green, A.blue=C5.blue, A.alpha= C5.alpha.

TABLE 2

$$A = C5$$
$$Px = C7 - A$$
$$Py = CD - A$$
$$C1d = \lfloor C1 - (A - \tfrac{1}{2} Py) \rfloor$$
$$C3d = \lfloor C3 - (A + Px - \tfrac{1}{2} Py) \rfloor$$
$$C9d = \lfloor C9 - (A + \tfrac{1}{2} Py) \rfloor$$
$$CBd = \lfloor CB - (A + Px + \tfrac{1}{2} Py) \rfloor$$
$$CFd = \lfloor CF - (A + Px + Py) \rfloor$$

Table 3 illustrates the manner in which the pixel values Cx are recovered from anchor, predictors and deltas for decompression.

TABLE 3

$$C1 = \lfloor C1d + (A - \tfrac{1}{2} Py) + \tfrac{1}{2} \rfloor$$
$$C3 = \lfloor C3d + (A + Px - \tfrac{1}{2} Py) + \tfrac{1}{2} \rfloor$$
$$C5 = A$$
$$C7 = \lfloor (A + Px) + \tfrac{1}{2} \rfloor$$
$$C9 = \lfloor C9d + (A + \tfrac{1}{2} Py) + \tfrac{1}{2} \rfloor$$
$$CB = \lfloor CBd + (A + Px + \tfrac{1}{2} Py) + \tfrac{1}{2} \rfloor$$
$$CD = \lfloor (A + Py) + \tfrac{1}{2} \rfloor$$
$$CF = \lfloor CFd + (A + Px + Py) + \tfrac{1}{2} \rfloor$$

The computations are carried out to an accuracy of one fractional bit. In an implementation using only integer numbers, this can be accomplished by multiplying all input colors by 2 and then dividing the final results by 2. For example, the following steps set forth in Table 4 are performed to compute C1d.

TABLE 4

$$A \mathrel{*}= 2; Px \mathrel{*}= 2; Py \mathrel{*}= 2; C1 \mathrel{*}= 2;$$
$$C1d = \tfrac{1}{2} * \lfloor C1 - (A - \tfrac{1}{2} Py) \rfloor$$

Similarly, the steps of Table 5 are performed to recover the value of C1.

TABLE 5

$$A \mathrel{*}= 2; Px \mathrel{*}= 2; Py \mathrel{*}= 2; Cd1 \mathrel{*}= 1;$$
$$C1 = \tfrac{1}{2} * \lfloor C1d + (A - \tfrac{1}{2} Py) + \tfrac{1}{2} \rfloor$$

In order for a tile to be compacted, the information representing anchor, predictors and deltas should be representable with no more than half the number of bits required for the original color values. If each of the color channels (red, green, blue, alpha) is represented with 8 bits, one sample requires 32-bits, and a reduce tile requires 8*32 bits=256 bits. Therefore, the number of bits for the compressed representation must fit into 128 bits or less. This is possible if the number of bits to represent predictors and deltas is small enough. It should be noted that the anchor color should be stored with full precision, e.g. A8R8G8B8.

Detailed below is the number of bits allocated for predictors and delta values for 2 cases that are implemented in one preferred embodiment. In these compression formats, it is assumed that all pixels in the tile have the same alpha value, because alpha tends to vary less than other color components in most applications. One may distinguish between two cases: (1) alpha is 0 or 1 (2) alpha is not 0 or 1. Note Tables 6 & 7.

TABLE 6

| Case 1: Alpha = 0 or 1 | |
| --- | --- |
| Anchor: | 24 bits (R8G8B8) |
| Px: | 12 bits (R4G4B4) |
| Py: | 14 bits (R5G5B4) |
| Deltas: | 15 bits (R5G5B5) |
| Alpha | 1 bit (0: alpha = 0, 1: alpha = 1) |

This gives a total of 24+12+14+5*15+1=126 bits. The use of the remaining 2 bits will be explained below.

TABLE

| Case 2: Alpha ≠ 0 or 1 | |
| --- | --- |
| Anchor: | 24 bits (R8G8B8) |
| Px: | 16 bits (R6G5B5) |
| Py: | 18 bits (R6B6G6) |
| Deltas: | 12 bits (R4G4B4) |
| Alpha: | 8 bits (A8) |

This gives a total of 24+16+18+5*12+8=126 bits. The use of the remaining 2 bits will now be explained.

One extra bit is required to distinguish between the two cases. An additional bit is reserved to indicate that the tile is in a special clear format, where all pixels have the same color and alpha. Then, such single color and the clear flag need only be stored, and bits 64–127 need not be written. Thus, tiles written during buffer clears in this special clear format are effectively written with 8:1 compression. However, when these tiles are read during subsequent rendering, all 128 bits are required, since the fast clear status is unknown at the time the read request is issued.

In the present format, the case selector is stored in bit 62 of the compressed format. The clear format indicator is stored in bit 63. As such, the final compressed pixel format looks like that shown in Table 8.

TABLE 8

| Case 1: Alpha = 0 or 1 | |
| --- | --- |
| [0] | Alpha [1] |
| [24:1] | Anchor [24] |
| [36:25] | Px [12] |
| [50:37] | Py [14] |
| [61:51] | Cd1 [11 LSBs] |
| [62] | 1 |
| [63] | 0 |
| [67:64] | Cd1 [4 MSBs] |
| [82:68] | C3d [15] |
| [97:83] | C9d [15] |
| [112:98] | CBd [15] |
| [127:113] | CFd [15] |
| Case 2: Alpha ≠ 0 or 1 | |
| [7:0] | Alpha [8] |
| [31:8] | Anchor [24] |
| [47:32] | Px [16] |
| [61:48] | Py [14 LSBs] |
| [62] | 0 |
| [63] | 0 |
| [67:64] | Py (4 MSBs) |
| [79:68] | C1d [12] |
| [91:80] | C3d [12] |
| [103:92] | C9d [12] |
| [115:104] | CBd [12] |
| [127:116] | CFd [12] |

TABLE 8-continued

Clear format: All colors identical

| [7:0] | Alpha [8] |
| [31:8] | Clear color [24] |
| [62:32] | X |
| [63] | 1 |

FIG. 9 illustrates, in accordance with one embodiment, a method 900 for processing samples in which data is read from the frame buffer prior to processing. Such processing could include alpha blending or logic operations on pixel data, for example. It may also include cases in which compressed data is read in order to uncompress it and write it out expanded, due to partial coverage by an uncompressible partial tile.

Initially, in operation 902, a first set of samples is received as described in method 600 above. A second set of samples may then be retrieved from a frame buffer in operation 904. Said retrieval may also include the uncompacting of the samples if they were stored in the frame buffer in compacted form. The first set of samples is then compared with the second set of samples. Note decision 906. In particular, the comparison may include determining whether the first set of samples and the second set of samples are similarly reduced.

If decision 906 indicates that the first and second sets of samples are similarly reduced, the first set of samples and the second set of samples are processed in reduced form, as set forth in operation 908. If decision 906 indicates that the first and second sets of samples are not similarly reduced, the reduced samples are expanded in operation 910 and the first set of samples is processed with the second set of samples in expanded form, as set forth in operation 912.

As described above, the tiles may propagate through the graphics system in reduced format. Since the reduced format is simply an abbreviation for the fact that all reduced fragments have identical color and alpha values, processing for these fragments can be done without expanding the fragments during processing.

If processing fragments requires the current frame buffer contents, e.g. for alpha blending, processing in reduced form is only possible if both fragment color and destination color are reduced/compacted. It should be noted that a compacted tile decompresses into a reduced representation.

Some tiles processed in the graphics system may not contain fragments for all samples in a tile. Such tiles may be referred to as "partially covered" tiles. Partial coverage may be the result of either incomplete coverage of the tile by primitives or because of pixels or samples killed during an alpha-test, z-test, stencil-test, or similar operation. When writing a partially covered tile to a compressed tile in the frame buffer memory 206, the incoming fragment data should be merged with the destination data. This involves the following steps of Table 9.

TABLE 9

Read and uncompress the destination data
Modify the destination data by merging in the source fragments
Write back the modified tile to the destination This Read-Modify-Write (RMW) cycle may be slow because it (a) requires the compressed data from the frame buffer to be retrieved, (b) requires uncompressing the data, and finally (c) requires writing back the entire tile to the frame buffer. Reading from and writing data to the same memory location is inefficient with modern DRAMs as it incurs a penalty for changing the memory from read-mode into write-mode (read-write turnaround).

Generally, writing back data after a partially covered tile was merged with a compressed destination tile, will result in incompressible data. Although it is conceivable that the merged data are compressible, it is very unlikely. In one preferred embodiment, the write operation (see Table 9) requires writing back a full tile with uncompressed pixels.

If processing fragments does not require the current frame buffer contents, partially-covered source tiles may present a quandary. If the data stored in the frame buffer is compressed, it must be read, expanded, combined with the partially-covered source tile, and written back to the frame buffer unexpanded, as described above. However, if the data stored in the frame buffer is not compressed, the frame buffer data need not be read. Rather, the uncompressed source data can be written to the frame buffer directly, in expanded form, using byte enables. The quandary is whether to issue the destination read request. The data may or may not be needed, and it is unknown at the time the read request is issued. It would be wasteful to read destination data every time a partially-covered source tile is received, particularly, since the data is needed only if compressed.

To avoid performing wasteful reads in this case, one implementation supports a "conditional read" operation. A conditional read acts like a regular read if the destination is compressed, i.e. the data are returned. However, if the destination is not compressed, only the compression status and no data are returned. If the destination is not compressed, the incoming fragment data are written directly to the destination in compressed form without a prior read from the destination.

Once the multisampled image has been rendered, it may be down-filtered in order to be displayed. The downfiltering operation can be done using a separate filtering pass. Alternatively, the downfilter operation can be performed during video scan out and display. One preferred embodiment supports both modes of operation, as the filtering pass is needed for windowed rendering, whereas downfiltering during scan out is more efficient for full-screen applications.

The downfilter pass is performed by treating the high-resolution, multisampled image as a texture, and using texture filtering hardware to convolve the contributions of the various samples into an antialiased color value at each displayable pixel. A preferred embodiment fetches samples in a pattern that allows them to be decompressed and used directly, thus avoiding redundant reads of the multisample color buffer.

When filtering during video scan out, it is also desirable to take advantage of compression such that compressed data is read but once each time the image is displayed. This presents particular problems because video scan out accesses the image in raster scan order. The samples required for individual raster scan-lines do not fully cover 4×4-sample tiles. Rather, they cover a 4×1 horizontal stripe through the tile during 2-sample multisampling and they cover a 4×2 horizontal stripe through the tile during 4-sample multisampling. To avoid redundant reads when displaying the second scan line, one implementation provides on-chip buffering for one scan-line of compressed data. Thus, when sample data for one scan-line is read, any compressed tiles are retained on-chip and reused when displaying subsequent scan lines that refer to the same multisample tiles.

Although the discussion above has assumed a graphics system that implements multisampling, the principles above can be applied to a graphics system that performs super-sampling or that does no antialiasing at all. In this case, reduction would be infeasible, thus all compression would need to be done by compaction. It should be noted that the full benefit of fast clears may be achieved in such a system.

As mentioned earlier, the frame buffer may be cleared by writing compressed samples to the frame buffer. Further, an identifier may be included in the compressed samples indicating that the compressed samples are associated with the clearing of the frame buffer.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for transferring samples to a frame buffer in a graphics system, comprising:
    (a) receiving a plurality of samples generated utilizing a multi-sampling algorithm;
    (b) determining whether the samples are capable of being reduced, wherein reduced refers to a reduction of samples that exploits a similarity of attributes thereof that result from an anti-aliasing procedure;
    (c) reducing the samples if it is determined that the samples are capable of being reduced; and
    (d) transferring the samples to a frame buffer for storage therein;
        wherein the samples are both compacted and reduced;
        wherein the compaction includes the application of a compression algorithm on bits of a tile reduced utilizing the reduction.

2. The method as recited in claim 1, wherein the determination ret whether the samples are capable of being reduced is based on values of adjacent samples.

3. The method as recited in claim 2, wherein the values include color values.

4. The method as recited in claim 3, wherein the determination whether the samples are capable of being reduced includes comparing the color values of the adjacent samples.

5. The method as recited in claim 4, wherein the determination whether the samples are capable of being reduced further includes determining if the color values are the same based on the comparison.

6. The method as recited in claim 5, wherein the determination whether the samples are capable of being reduced further includes determining that the samples are capable of being reduced if the color values are the same.

7. The method as recited in claim 1, and further comprising determining whether the samples are sufficiently compressed by the reduction.

8. The method as recited in claim 7, and further comprising additionally compressing the samples if it is determined that the samples are insufficiently compressed by the reduction.

9. The method as recited in claim 8, and farther comprising reading the samples from the frame buffer.

10. The method as recited in claim 9, and further comprising determining whether the samples are compressed.

11. The method as recited in claim 10, wherein it is determined whether the samples are compressed utilizing an identifier associated with the samples.

12. The method as recited in claim 11, wherein the identifier identifies a type of compression carried out on the samples.

13. The method as recited in claim 11, wherein the identifier is stored in the compression samples.

14. The method as recited in claim 11, and further comprising conditionally decompressing the samples based on the identifier.

15. The method as recited in claim 14, wherein the compressed samples read during scan out processing of one scan line are retained and used for processing of subsequent scan lines.

16. The method as recited in claim 14, wherein the decompression is carried out during a scan out operation.

17. The method as recited in claim 1, wherein the reduction of the samples is carried out in real-time.

18. The method as recited in claim 1, and further comprising conditionally reading the samples from the frame buffer.

19. The method as recited in claim 1, wherein the reduction of the samples results in less bandwidth being used during the transfer of the samples to the frame buffer than when storing the samples without compression.

20. The method as recited in claim 1, and further comprising clearing the frame buffer by writing compressed samples to the frame buffer.

21. The method as recited in claim 20, wherein an identifier is included in the compressed samples indicating that the compressed samples are associated with the clearing of the frame buffer.

22. The method as recited in claim 1, wherein (a)–(d) are carried out during a frame buffer read or write update process.

23. A system for transferring samples to a frame buffer, comprising:
    (a) means for receiving a plurality of samples generated utilizing a multi-sampling algorithm;
    (b) means for determining whether the samples are capable of being reduced, wherein reduced refers to a reduction of samples that exploits a similarity of attributes thereof that result from an anti-aliasing procedure;
    (c) means for reducing the samples if it is determined that the samples are capable of being reduced; and
    (d) means for transferring the samples to a frame buffer for storage therein;
        wherein the samples are both compacted and reduced;
        wherein the compaction includes the application of a compression algorithm on bits of a tile reduced utilizing the reduction.

24. A rasterizer operation module capable of transferring samples to a frame buffer in a graphics system with less bandwidth utilizing a method, the method comprising:
    (a) receiving a plurality of samples generated utilizing a multi-sampling algorithm;
    (b) determining whether the samples are capable of being reduced, wherein reduced refers to a reduction of samples that exploits a similarity of attributes thereof that result from an anti-aliasing procedure;
    (c) reducing the samples if it is determined that the samples are capable of being reduced; and
    (d) transferring the samples to a frame buffer for storage therein;
        wherein the samples are both compacted and reduced;
        wherein the compaction includes the application of a compression algorithm on bits of a tile reduced utilizing the reduction.

25. A system for transferring samples to a frame buffer, comprising:
(a) logic for receiving a plurality of samples generated utilizing a multi-sampling algorithm;
(b) logic for determining whether the samples are capable of being reduced, wherein reduced refers to a reduction of samples that exploits a similarity of attributes thereof that result from an anti-aliasing procedure;
(c) logic for reducing the samples if it is determined that the samples are capable of being reduced; and
(d) logic for transferring the samples to a frame buffer for storage therein;
wherein the samples are both compacted and reduced;
wherein the compaction includes the application of a compression algorithm on bits of a tile reduced utilizing the reduction.

26. A method for transferring samples to a frame buffer in a graphics system, comprising:
(a) receiving a tile including a plurality of samples generated utilizing a multi-sampling algorithm;
(b) reducing the tile of samples if it is determined that the samples are capable of being reduced, wherein reduced refers to a reduction of samples that exploits a similarity of attributes thereof that result from an anti-aliasing procedure;
(c) processing the tile of samples;
(d) determining whether the tile of samples is fully reduced;
(e) if it is determined that the tile of samples is fully reduced, expanding the tile of samples;
(f) if it is not determined that the tile of samples is fully reduced:
(i) determining a type of multi-sampling algorithm that was used to generate the tile of samples,
(ii) determining whether the tile of samples are compressible if a predetermined type of multi-sampling algorithm was used to generate the tile of samples, and
(iii) compressing the tile of samples if it is determined that the tile of samples is compressible; and
(g) transferring the tile of samples to a frame buffer for storage therein;
wherein the samples are both compacted and reduced;
wherein the compaction includes the application of a compression algorithm on bits of the tile reduced utilizing the reduction.

27. A method for the compression of pixel data for storing in a frame buffer, comprising:
(a) receiving a plurality of samples;
(b) determining whether the samples are capable of being compressed;
(c) compressing the samples if it is determined that the samples are capable of being compressed;
(d) transferring the samples to a frame buffer for storage therein;
wherein the samples are both compacted and reduced;
wherein the compaction includes the application of a compression algorithm on bits of a tile reduced utilizing the reduction.

28. The method as recited in claim 27, wherein the samples are organized as rectangular regions in screen space.

29. The method as recited in claim 28, wherein some of the samples in the rectangular regions include null samples.

30. The method as recited in claim 27, wherein the compression is lossless.

31. The method as recited in claim 27, wherein the samples are generated by multi-sampling.

32. The method as recited in claim 31, wherein the multi-sampling produces identical color values for samples covered by a primitive.

33. The method as recited in claim 32, wherein the determining includes determining whether all of the samples are covered.

34. The method as recited in claim 32, wherein the determining includes determining whether all of the samples that fall within the same pixel have identical color values.

35. The method as recited in claim 27, wherein the compression represents samples of identical color value by one sample with the color value.

36. The method as recited in claim 27, wherein the compression includes the reduction and the compaction.

37. The method as recited in claim 36, wherein the reduction represents samples of identical color value by one sample with the color value.

38. The method as recited in claim 37, wherein the compaction reduces the number bits required to store the samples.

39. The method as recited in claim 38, wherein the compaction includes: establishing an anchor sample, computing gradients in two independent directions, computing predicted pixel values for all samples, computing differences between predicted and actual sample values, determining whether the gradients and the differences are capable of being represented with a predetermined number of bits, and storing the anchor sample, the gradients and the differences with the predetermined number of bits if possible.

40. The method as recited in claim 38, wherein the compaction is performed by a selected one of several methods, where the selected method is encoded in the compressed samples.

41. The method as recited in claim 27, wherein the transferring includes: storing compressed samples if it is determined that the samples are capable of being compressed, storing uncompressed samples if it is determined that the samples are incapable of being compressed, and storing in memory a bit that indicates whether the samples are stored compressed or uncompressed.

42. The method as recited in claim 41, wherein the memory resides on a chip capable of processing the samples.

43. The method as recited in claim 27, wherein the transferring includes: storing compressed samples if it is determined that the samples are capable of being compressed, storing uncompressed samples if it is determined that the samples are incapable of being compressed, and indicating in memory whether the samples are stored compressed or uncompressed and a type of compression format.

44. The method as recited in claim 43, wherein the memory resides on a chip capable of processing the samples.

45. A method for processing compressed pixel data, comprising:
(a) receiving a plurality of samples;
(b) reading samples from a frame buffer which are associated with the received samples;
(c) determining whether the samples can be processed in reduced form, wherein reduced refers to a reduction of samples that exploits a similarity of attributes thereof that result from an anti-aliasing procedure;
(d) processing the samples in at least one of a reduced form and an expanded form;

(e) attempting to compress the processed samples; and (f) writing the processed samples to the frame buffer;

wherein the samples are both compacted and reduced;

wherein the compaction includes the application of a compression algorithm on bits of a tile reduced utilizing the reduction.

46. The method as recited in claim 45, wherein the plurality of samples is generated by multi-sampling.

47. The method as recited in claim 45, wherein the plurality of samples is organized as rectangular regions in screen space.

48. The method as recited in claim 45, wherein the reading includes: identifying samples that are covered, issuing a read request to the frame buffer for the covered samples, receiving color values for the covered samples, un-compacting the color values if the read color samples are stored compressed in the frame buffer.

49. The method as recited in claim 48, wherein the read request includes a conditional read request, and further comprising: issuing the conditional read request to the frame buffer, determining whether the samples are stored compressed in the frame buffer, receiving no data if the samples are stored uncompressed, and receiving the compressed samples if the samples are stored compressed.

50. The method as recited in claim 48, wherein the read request includes a conditional read request if the samples are capable of being stored compressed in the frame buffer.

51. The method as recited in claim 48, wherein the read request includes a conditional read request if some of the samples are uncovered.

52. The method as recited in claim 45, wherein the determining of operation (c) includes: determining whether the samples are in the reduced form.

53. The method as recited in claim 45, wherein the processing includes using a color value that represents all of the samples in the reduced form.

54. The method as recited in claim 45, wherein the processing in expanded form includes processing the samples in an uncompressed form by: determining whether the received samples are reduced, expanding the received samples into an uncompressed form if it is determined that the received samples are reduced, determining whether the read samples are reduced, and expanding the read samples into the uncompressed form if it is determined that the read samples are reduced, and processing the samples in the uncompressed form.

55. The method as recited in claim 45, wherein the attempting includes (i) determining whether all of the received samples are covered, determining whether all of the received samples are in the reduced form, (ii) determining whether it is permissible to store the received samples in a compressed form, (iii) determining whether the received samples are capable of being represented in the compressed form, and (iv) converting the received samples to the compressed form if (i)–(iii) are true.

56. A system for processing compressed pixel data, comprising:

(a) logic for receiving a plurality of samples;

(b) logic for reading samples from a frame buffer which are associated with the received samples;

(c) logic for determining whether the samples can be processed in reduced form, wherein reduced refers to a reduction of samples that exploits a similarity of attributes thereof that result from an anti-aliasing procedure;

(d) logic for processing the samples in at least one of a reduced form and an expanded form;

(e) logic for attempting to compress the processed samples; and (f) logic for writing the processed samples to the frame buffer;

wherein the samples are both compacted and reduced;

wherein the compaction includes the application of a compression algorithm on bits of a tile reduced utilizing the reduction.

57. A system for processing compressed pixel data, comprising:

(a) means for receiving a plurality of samples;

(b) means for reading samples from a frame buffer which are associated with the received samples;

(c) means for determining whether the samples can be processed in reduced form, wherein reduced refers to a reduction of samples that exploits a similarity of attributes thereof that result from an anti-aliasing procedure;

(d) means for processing the samples in at least one of a reduced form and an expanded form;

(e) means for attempting to compress the processed samples; and (f) means for writing the processed samples to the frame buffer;

wherein the samples are both compacted and reduced;

wherein the compaction includes the application of a compression algorithm on bits of a tile reduced utilizing the reduction.

58. A method for transferring a set of samples to a frame buffer in a graphics system, comprising:

(a) receiving a set of a plurality of samples;

(b) determining whether the set of samples is capable of being compressed;

(c) compressing the set of samples if it is determined that the set of samples is capable of being compressed; and (d) transferring the set of samples to a frame buffer;

(e) wherein a size of the set of samples is dictated by a transaction size of the frame buffer;

wherein the samples are both compacted and reduced;

wherein the compaction includes the application of a compression algorithm on bits of a tile reduced utilizing the reduction.

59. The method as recited in claim 58, and further comprising transferring the set of samples from the frame buffer.

60. The method as recited in claim 59, and further comprising compressing the set of samples transferred from the frame buffer.

61. The method as recited in claim 58, wherein the set of samples includes a rectilinear set of samples.

62. The method as recited in claim 58, wherein the transaction size of the frame buffer is a size of data that the frame buffer is capable of reading and writing.

63. The method as recited in claim 58, wherein a plurality of the sets of samples form a single frame.

64. A method for transferring samples to a frame buffer in a graphics system, comprising:

(a) receiving a plurality of samples generated utilizing a multi-sampling algorithm;

(b) reducing the samples;

(c) determining whether the samples are sufficiently compressed by the reduction;

(d) compressing the samples if it is determined that the samples are insufficiently compressed by the reduction;

(e) transferring the samples to a frame buffer for storage therein;

wherein the samples are both compacted and reduced;

wherein the compaction includes the application of a compression algorithm on bits of a tile reduced utilizing the reduction.

65. A system for transferring samples to a frame buffer, comprising:

(a) logic for receiving a plurality of samples generated utilizing a multi-sampling algorithm;

(b) logic for reducing the samples;

(c) logic for determining whether the samples are sufficiently compressed by the reduction;

(d) logic for compressing the samples if it is determined that the samples are insufficiently compressed by the reduction;

(e) logic for transferring the samples to a frame buffer for storage therein;

wherein the samples are both compacted and reduced;

wherein the compaction includes the application of a compression algorithm on bits of a tile reduced utilizing the reduction.

66. A method for transferring multi-sampled color data to a frame buffer in a graphics system, comprising:

(a) determining whether multi-sampled color data can be represented in a reduced form, wherein reduced refers to a reduction that exploits a similarity of attributes that result from an anti-aliasing procedure; and (b) transferring the multi-sampled color data to a frame buffer for storage therein in the reduced form, if it is determined that the multi-sampled color data can be represented in the reduced form;

wherein the color data is both compacted and reduced;

wherein the compaction includes the application of a compression algorithm on bits of a tile reduced utilizing the reduction.

* * * * *

UNITED STATES PATENT AND TRADEMARK OFFICE
CERTIFICATE OF CORRECTION

| | | |
|---|---|---|
| PATENT NO. | : 6,825,847 B1 | Page 1 of 1 |
| APPLICATION NO. | : 10/006409 | |
| DATED | : November 30, 2004 | |
| INVENTOR(S) | : Molnar et al. | |

It is certified that error appears in the above-identified patent and that said Letters Patent is hereby corrected as shown below:

In the claims:
Col. 13, line 38, please delete "ret";
Col. 13, line 60, please replace "farther" with --further--.

Signed and Sealed this
Twelfth Day of July, 2011

David J. Kappos
*Director of the United States Patent and Trademark Office*